US012756118B2

(12) United States Patent
Gevoy et al.

(10) Patent No.: US 12,756,118 B2
(45) Date of Patent: Oct. 6, 2026

(54) FLEXIBLE HV CONNECTOR BUSBAR INTERCONNECT SYSTEM

(71) Applicant: Vitesco Technologies USA, LLC, Auburn Hills, MI (US)

(72) Inventors: Alexander Gevoy, West Bloomfield, MI (US); Omar Mendizabal Riveros, San Pedro Tlaquepaque (MX); Wesley Tomczyk, Hoffman Estates, IL (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 385 days.

(21) Appl. No.: 18/592,225

(22) Filed: Feb. 29, 2024

(65) Prior Publication Data

US 2025/0279598 A1 Sep. 4, 2025

(51) Int. Cl.
*H01R 11/09* (2006.01)
*H02M 7/00* (2006.01)

(52) U.S. Cl.
CPC ............ *H01R 11/09* (2013.01); *H02M 7/003* (2013.01)

(58) Field of Classification Search
CPC .......... H01R 11/09; H01R 9/226; H01R 4/30; H01R 9/18; H01R 2201/26; H01R 13/514; H01R 13/40; H01R 13/502; H01R 24/00; H02M 7/003; H05K 7/14329
See application file for complete search history.

(56) References Cited

U.S. PATENT DOCUMENTS 9,620,763 B1 * 4/2017 Zeng .................. H01M 50/522
9,997,878 B1 6/2018 Hua
11,646,458 B2 5/2023 Yasuda
2008/0123256 A1 * 5/2008 Fuzetti .................. H01R 4/363 174/99 B
2012/0052747 A1 * 3/2012 Kataoka ............... H01R 13/193 439/701
2012/0184125 A1 * 7/2012 Suzuki ................. H01R 13/193 439/345
2012/0238147 A1 * 9/2012 Matsumoto .......... H01R 13/512 439/660
2013/0196545 A1 * 8/2013 Adachi ................ H01R 13/193 439/626
2013/0196558 A1 * 8/2013 Adachi .............. H01R 13/6315 439/856
2013/0237074 A1 * 9/2013 Yagome ............. H01R 13/4538 439/135
2014/0127920 A1 * 5/2014 Tanaka ................ H01R 13/447 439/135

(Continued)

*Primary Examiner* — Truc T Nguyen

(57) ABSTRACT

A busbar interconnect system having a housing of an inverter, and an interconnect assembly mounted in the housing, where the interconnect assembly includes an insulator housing, a first busbar having first and second ends, a second busbar having first and second ends, and the first busbar, the second busbar, and a mounting bracket at least partially surrounded by the insulator housing, the mounting bracket mounted to the housing. In a first configuration, a first of a plurality of connectors is connected to the first end of the first busbar and a second of the plurality of connectors is connected to the first end of the second busbar. In a second configuration, the first of the plurality of connectors is connected to the second end of the first busbar and the second of the plurality of connectors is connected to the second end of the second busbar.

10 Claims, 6 Drawing Sheets

(56) References Cited

U.S. PATENT DOCUMENTS

2014/0318860 A1* 10/2014 Kuji .................... H01R 13/193
439/304
2014/0322965 A1* 10/2014 Kuji .................... H01R 13/639
439/527
2015/0038020 A1* 2/2015 Kinomura .............. B60L 50/66
439/653
2015/0233980 A1* 8/2015 Umetsu .............. H01R 13/6683
439/620.22
2015/0237758 A1* 8/2015 Mills .................... H01H 50/047
361/819
2016/0172781 A1* 6/2016 Nunner .................... H01R 4/38
439/660
2020/0136364 A1 4/2020 Lescow
2022/0140523 A1* 5/2022 Tyler ...................... H01R 13/41
439/283
2022/0181855 A1 6/2022 Gomez Barbero
2023/0014903 A1 1/2023 Oga
2023/0057532 A1 2/2023 Lu
2023/0079068 A1* 3/2023 Kanematsu ............ H01R 13/05
439/660
2023/0178858 A1 6/2023 Kotak
2023/0180410 A1* 6/2023 Ng ........................ H02M 7/003
2023/0183479 A1* 6/2023 Wolf ........................ B60L 53/16
180/65.8
2023/0291225 A1* 9/2023 Alvi .......................... H02J 7/02
2023/0396183 A1* 12/2023 Katsube ................ H02M 7/003
2024/0022178 A1* 1/2024 Alvi .................... H02M 1/0029
2024/0030664 A1* 1/2024 Gundermann ..... H01R 13/6215
2024/0300423 A1* 9/2024 Fujimoto ................ H02P 27/06
2024/0429634 A1* 12/2024 Metzler ............... H01M 50/509
2025/0050739 A1* 2/2025 Doo ........................ B60L 3/003
2025/0055385 A1* 2/2025 Ugare ...................... H02G 5/02
2025/0105604 A1* 3/2025 Jeong ................... H05K 9/0015
2025/0167081 A1* 5/2025 Kanale ................ H10W 70/481
2025/0239802 A1* 7/2025 Hemnani ............. H01R 13/639
2025/0260213 A1* 8/2025 De Guzman ............ H02B 1/20
2025/0286469 A1* 9/2025 Buehler ................ H02M 7/003
2025/0323614 A1* 10/2025 Chiu ....................... H01F 17/06
2025/0337175 A1* 10/2025 Doo ......................... H01G 4/38
2025/0344331 A1* 11/2025 Silkiss-Hero ......... B60L 15/007

* cited by examiner

FLEXIBLE HV CONNECTOR BUSBAR INTERCONNECT SYSTEM

FIELD OF THE INVENTION

The invention relates generally to a busbar interconnect system for an inverter, which facilitates the connection between a high-voltage DC battery and a high-voltage inverter.

BACKGROUND OF THE INVENTION

Power inverters for hybrid electric and battery electric vehicles are generally known. Current high-voltage (HV) inverters have non-configurable battery input/output. Therefore, there is only one possible connection between the DC connectors of battery cables and the inverter. This limitation of how the DC connectors may be connected to the inverter limits the various applications an HV inverter may be used for. Hybrid electric and battery electric vehicles may have different design restraints and packaging requirements.

Accordingly, there exists a need for configurable connection between an HV electronic box and a battery, which is suitable for multiple applications, provides for multiple orientations and connections between the HV box and the battery, and also meets various packaging requirements.

SUMMARY OF THE INVENTION

In an embodiment, the present invention is a busbar interconnect system for an inverter. In an embodiment, the busbar interconnect system provides one or more possible connections between a high-voltage (HV) DC battery and HV inverter in a vehicle.

The busbar interconnect system of the present invention improves transmitting power efficiency, reduces weight, volume, cost and complexity of power management systems, as well as simplifies and improves flexibility of the assembly process. The busbar interconnect system is suitable for use with a HV inverter and vehicles having various powertrain architectures.

In an embodiment, the busbar interconnect system of the present invention includes an interconnect assembly having two busbars, a plastic holder (such as an insulator housing), several fasteners (such as a self-clinching or weld fastener), and a mounting feature to fasten the interconnect assembly to the inverter housing.

In an embodiment, the terminals of the DC connector may be connected to the interconnect assembly in one of multiple ways, such that it is only necessary to change the location of where the terminals are connected to the busbars to accommodate the different vehicle applications.

The busbar interconnect system of the present invention facilitates ease of installation by using standard screw sizes, providing functionality that minimizes complexity during the assembly process.

The busbar interconnect system of the present invention includes the use of busbars which are shaped to reserve sufficient design margin to mount an HV battery connector, such that the bearing surface of the busbars in contact with the HV battery connector is suitable to facilitate the current load of the HV battery connector.

The busbar interconnect system of the present invention allows for the flexibility of connecting the HV DC input to the inverter in multiple locations.

In an embodiment, the busbar interconnect system of the present invention

In one or more embodiments, the busbar interconnect system of the present invention may be used for applications such as HV DC or AC connection points.

The busbar interconnect system of the present invention provides a versatile (i.e., flexible connection) connection solution between an HV DC battery and an HV inverter. The busbar interconnect system of the present invention includes the fastening of HV DC connectors to the inverter in various positions which allows for accommodation of various packaging requirements of the vehicle.

In an embodiment, the busbar interconnect system of the present invention includes connection points located on opposite sides of inverter.

In an embodiment, the present invention is a busbar interconnect system, having a housing of an inverter, and an interconnect assembly mounted in the housing, where the interconnect assembly includes an insulator housing, a first busbar having a first end and a second end, the first busbar at least partially surrounded by the insulator housing, a second busbar having a first end and a second end, the second busbar at least partially surrounded by the insulator housing, and a mounting bracket at least partially surrounded by the insulator housing, the mounting bracket mounted to the housing.

In a first configuration, a first of a plurality of connectors is connected to the first end of the first busbar and a second of the plurality of connectors is connected to the first end of the second busbar. In a second configuration, the first of the plurality of connectors is connected to the second end of the first busbar and the second of the plurality of connectors is connected to the second end of the second busbar.

In an embodiment, the housing of the inverter includes a first housing portion, a second housing portion connected to the first housing portion and forming a cavity, the interconnect assembly disposed in the cavity. In an embodiment, a first mounting boss is integrally formed as part of the second housing portion and a second mounting boss is integrally formed as part of the second housing portion such that the mounting bracket is connected to the first mounting boss and the second mounting boss.

In an embodiment, the mounting bracket includes a first leg, which protrudes from the insulator housing, a first mounting flange integrally formed with the first leg, a second leg, which protrudes from the insulator housing, and a second mounting flange integrally formed with the second leg. In an embodiment, the first mounting flange is connected to the first mounting boss, and the second mounting flange is connected to the second mounting boss.

In an embodiment, the first housing portion of the inverter includes a first pair of apertures integrally formed as part of the first housing portion, and a second pair of apertures integrally formed as part of the first housing portion.

In the first configuration, the first of the plurality of connectors extends through one of the first pair of apertures when the first of the plurality of connectors is connected to the first end of the first busbar, and the second of the plurality of connectors extends through another of the first pair of apertures when the second of the plurality of connectors is connected to the first end of the second busbar.

In the second configuration, the first of the plurality of connectors extends through one of the second pair of apertures when the first of the plurality of connectors is connected to the second end of the first busbar, and the second of the plurality of connectors extends through another of the second pair of apertures when the second of the plurality of connectors is connected to the second end of the second busbar.

In an embodiment, each of the plurality of connectors includes a terminal having an assembly aperture, and the terminal is connected to one of the first busbar or the second busbar when the plurality of connectors are in the first configuration or the second configuration.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
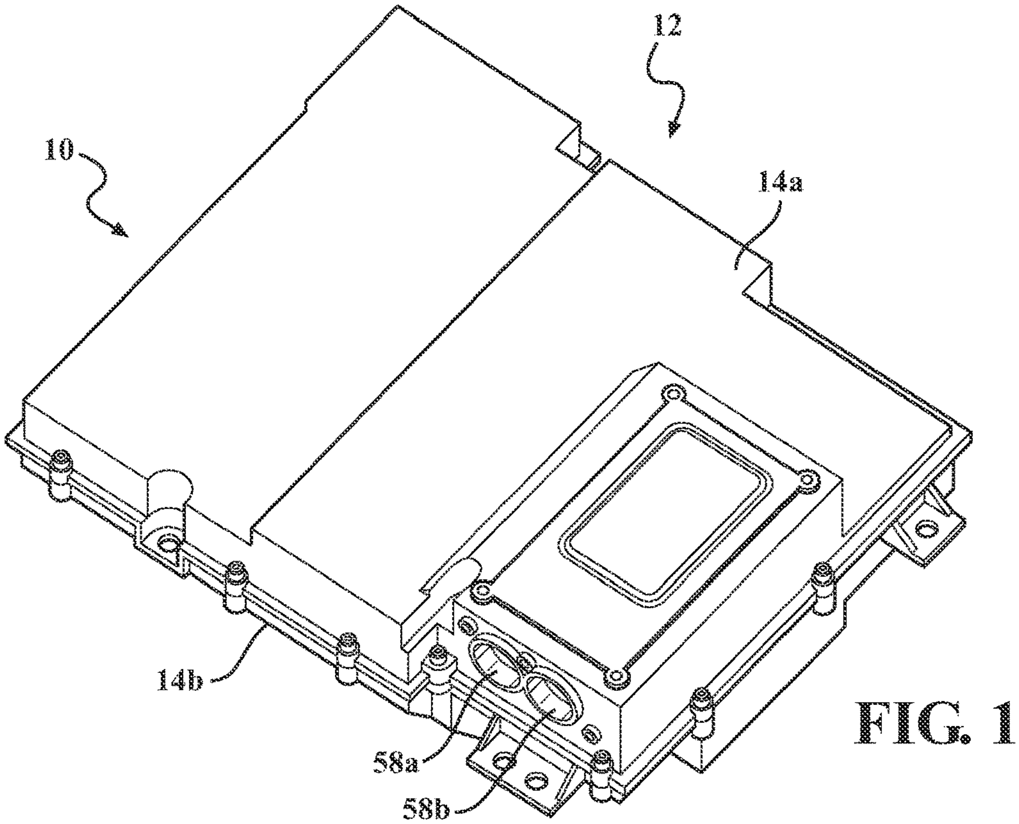
FIG. 1 is a perspective view of a high voltage inverter having a busbar interconnect system, according to embodiments of the present invention.
Figure 2:
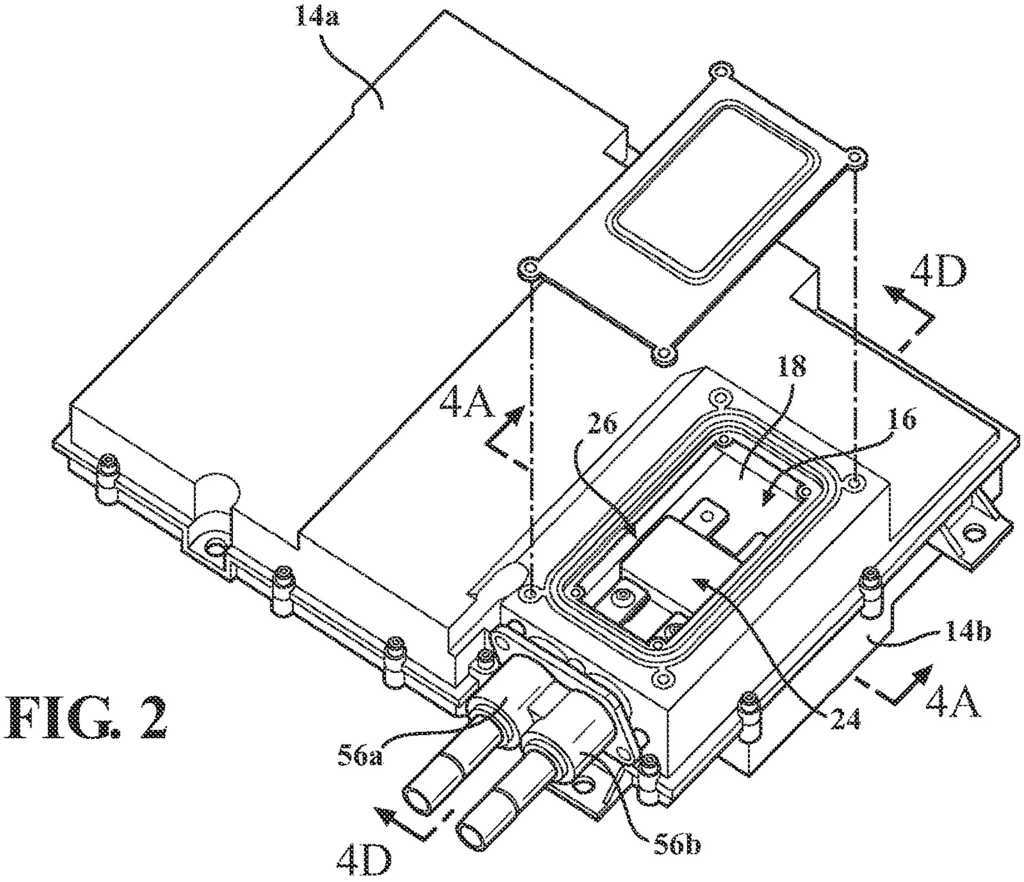
FIG. 2 is a perspective view of a high voltage inverter having a busbar interconnect system, with the cover of the inverter removed, according to embodiments of the present invention.

An inverter having a busbar interconnect system according to the present invention is shown in FIG. 1, generally at 10. Referring to FIGS. 1-2, the inverter includes a housing, shown generally at 12, having first housing portion 14*a* and a second housing portion 14*b* and disposed in a cavity, shown generally at 16, of the housing 12 is an electromagnetic interference (EMI) filter assembly, shown generally at 18.

Also disposed in the cavity 16 and in electrical communication with the EMI filter assembly 18 is a first busbar 20 and a second busbar 22. The busbars 20,22 are part of an interconnect assembly, shown generally at 24. The first housing portion 14*a* includes an aperture, shown generally at 26, and the interconnect assembly 24 is located in the cavity 16 such that the interconnect assembly 24 may be seen when looking into the aperture 26, as shown in FIG. 2.

Figure 3A:
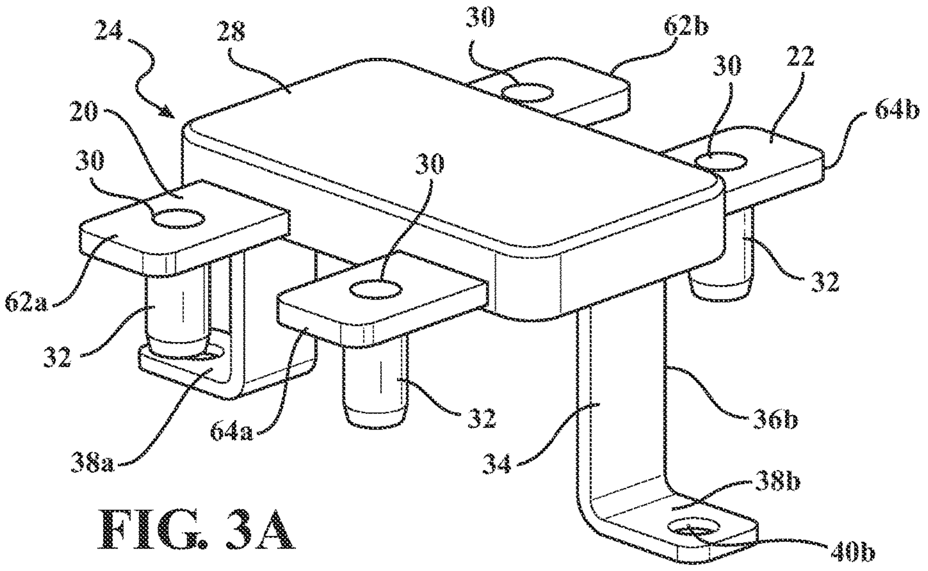
FIG. 3A is a perspective view of an interconnect assembly which is part of a busbar interconnect system, according to embodiments of the present invention.
Figure 3B:
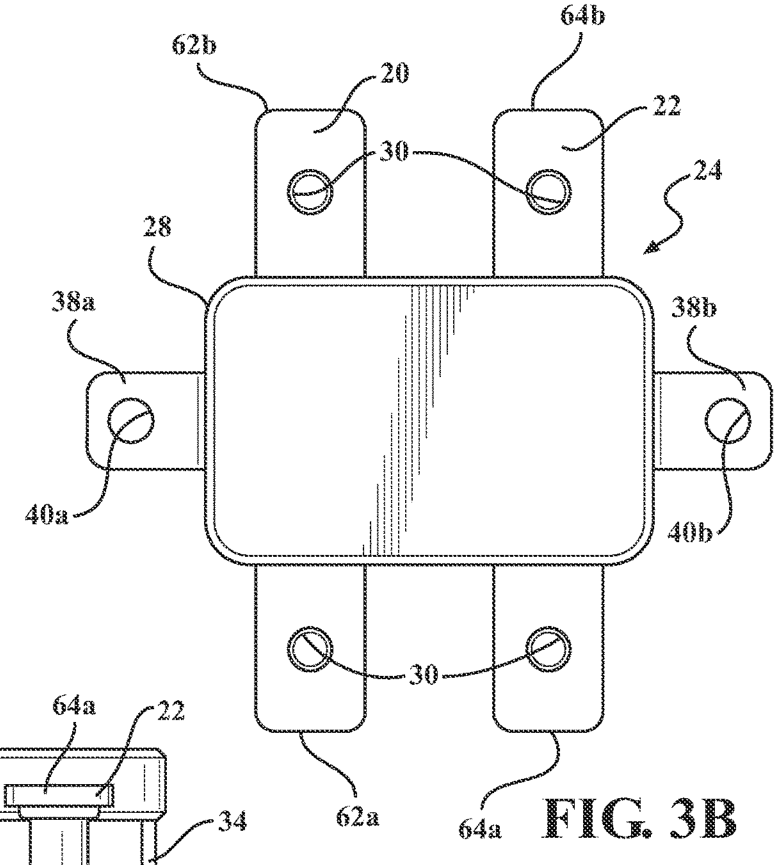
FIG. 3B is a top view of an interconnect assembly which is part of a busbar interconnect system, according to embodiments of the present invention.
Figure 3C:
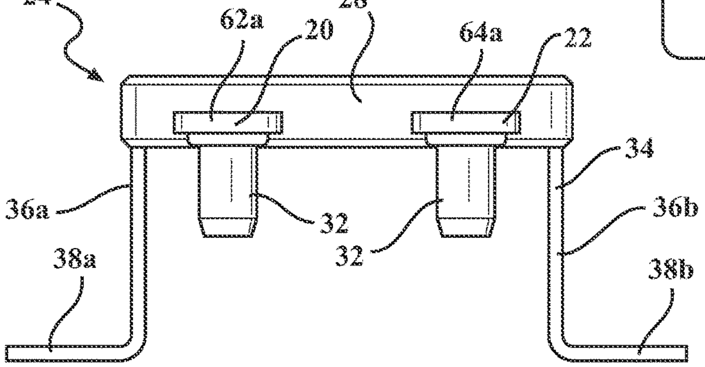
FIG. 3C is a side view of an interconnect assembly which is part of a busbar interconnect system, according to embodiments of the present invention.

Referring to FIGS. 3A-3C, the interconnect assembly 24 includes an insulator housing 28, which functions as an insulator. The busbars 20,22 extend through the insulator housing 28, and the busbars 20,22 are spaced apart from one another to provide a sufficient clearance, or air gap, to prevent undesirable arcing. In an embodiment, the air gap between the busbars 20,22 may be 8 mm, but it is within the scope of the invention that the air gap may be more or less to accommodate different voltages, allowable pollution levels, and various required creepages/clearances, depending upon the application.

The busbars 20,22 also include various mounting apertures 30 and connected to the busbars 20,22 are connection features 32, and each of the connection feature 32 is press-fit into a corresponding mounting aperture 30, shown in FIG. 3A-3C. More specifically, in an embodiment, each of the connection features 32 is generally cylindrical in shape and includes a corresponding flange portion (not shown), which is pressed into a corresponding mounting aperture 30, and each of the connection features 32 also has an internal threaded surface, which is used for connection with a fastener, such as a screw or bolt. In other embodiments the connection features 32 may be a self-clinching fastener or weld fastener.

The interconnect assembly 24 also includes a mounting bracket 34. The mounting bracket 34 includes a first leg 36*a* and a second leg 36*b*, and extending from the first leg 36*a* is a first mounting flange 38*a*, and extending from the second leg 36*b* is a second mounting flange 38*b*. There is also a mounting aperture 40*a*,40*b* integrally formed as part of each mounting flange 38*a*,38*b*, respectively.

Figure 4A:
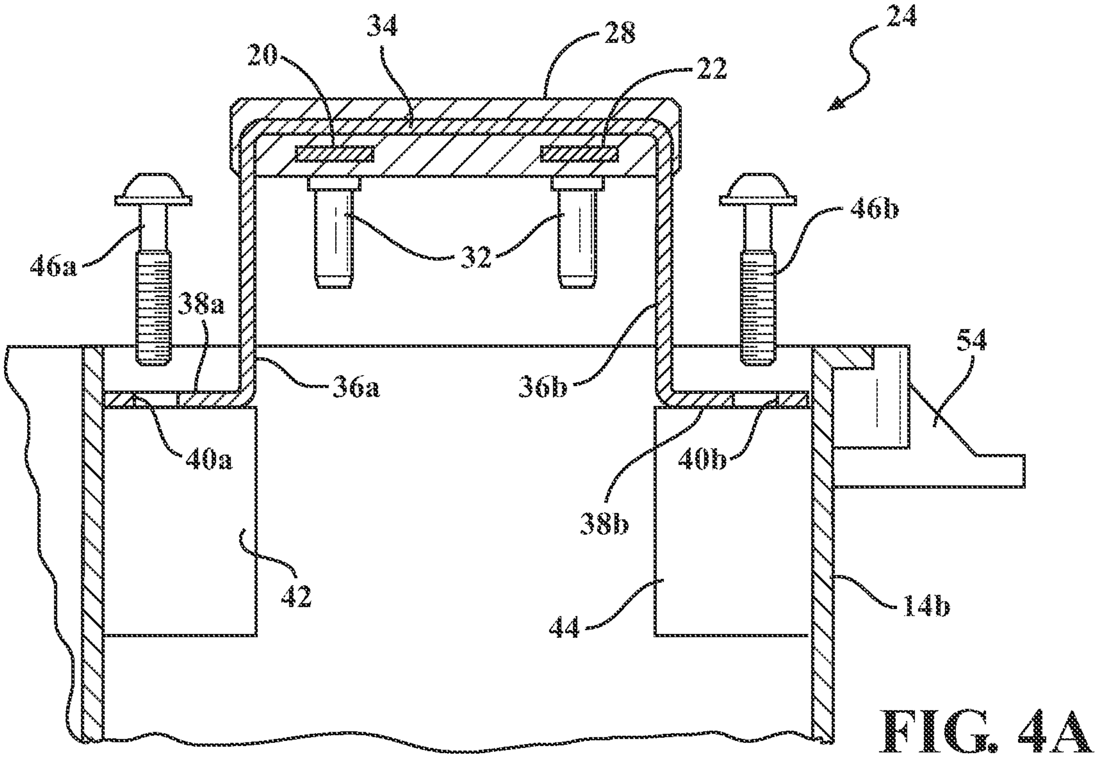
FIG. 4A is a sectional view taken along lines 4A-4A of FIG. 2, prior to the fasteners being inserted into mounting bosses of the second housing portion of the inverter, and prior to the first housing portion being connected to the second housing portion.
Figure 4B:
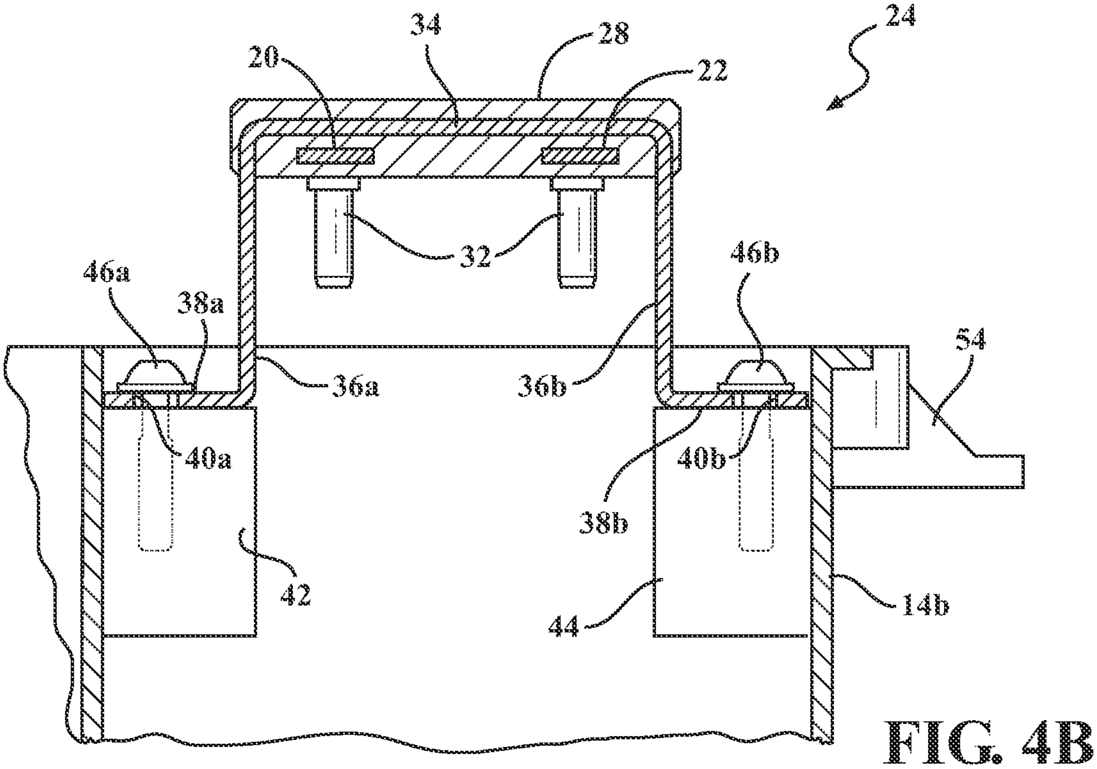
FIG. 4B is a sectional view taken along lines 4A-4A of FIG. 2, after the fasteners have been inserted into mounting bosses of the second housing portion of the inverter, and prior to the first housing portion of the inverter being connected to the second housing portion of the inverter.

Referring to FIGS. 4A-4D, during assembly, the interconnect assembly 24 is attached to two mounting bosses 42,44 located in the second housing portion 14*b*. More specifically, there is a first fastener 46*a* and a second fastener 46*b*, which in this embodiment are bolts, where the first fastener 46*a* is inserted through the mounting aperture 40*a* and into a corresponding threaded aperture of the first mounting boss 42, and the second fastener 46*a* is inserted through the mounting aperture 40*b* and into a corresponding threaded aperture of the second mounting boss 44. The fasteners 46*a*,46*b* inserted into the apertures of the mounting bosses 42,44 is shown in FIG. 4B.

Figure 4C:
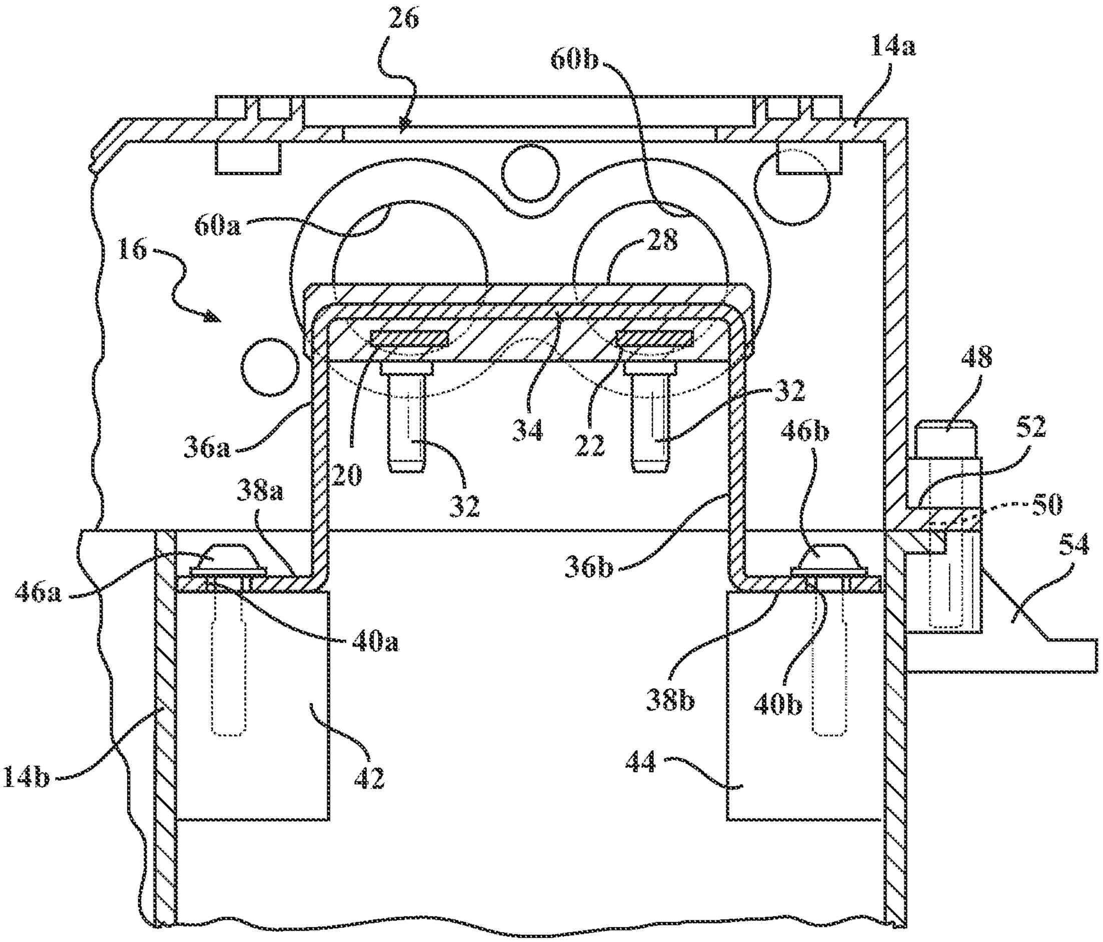
FIG. 4C is a sectional view taken along lines 4A-4A of FIG. 2, after the fasteners have been inserted into mounting bosses of the second housing portion of the inverter, and after the first housing portion of the inverter is connected to the second housing portion of the inverter.

Once the interconnect assembly 24 is mounted as shown in FIG. 4B, the first housing portion 14*a* is then connected to the second housing portion 14*b*. Referring to FIG. 4C, more specifically, another fastener 48 is inserted through an aperture 50 integrally formed as part of a flange portion 52, the fastener 48 is then inserted into a threaded aperture of a mounting protrusion 54. The flange portion 52 is part of the first housing portion 14*a*, and the mounting protrusion 54 is part of the second housing portion 14*b*. Referring to FIGS. 1-2, there are additional fasteners used in a similar manner to connect the first housing portion 14*a* to the second housing portion 14*b*.

Figure 4D:
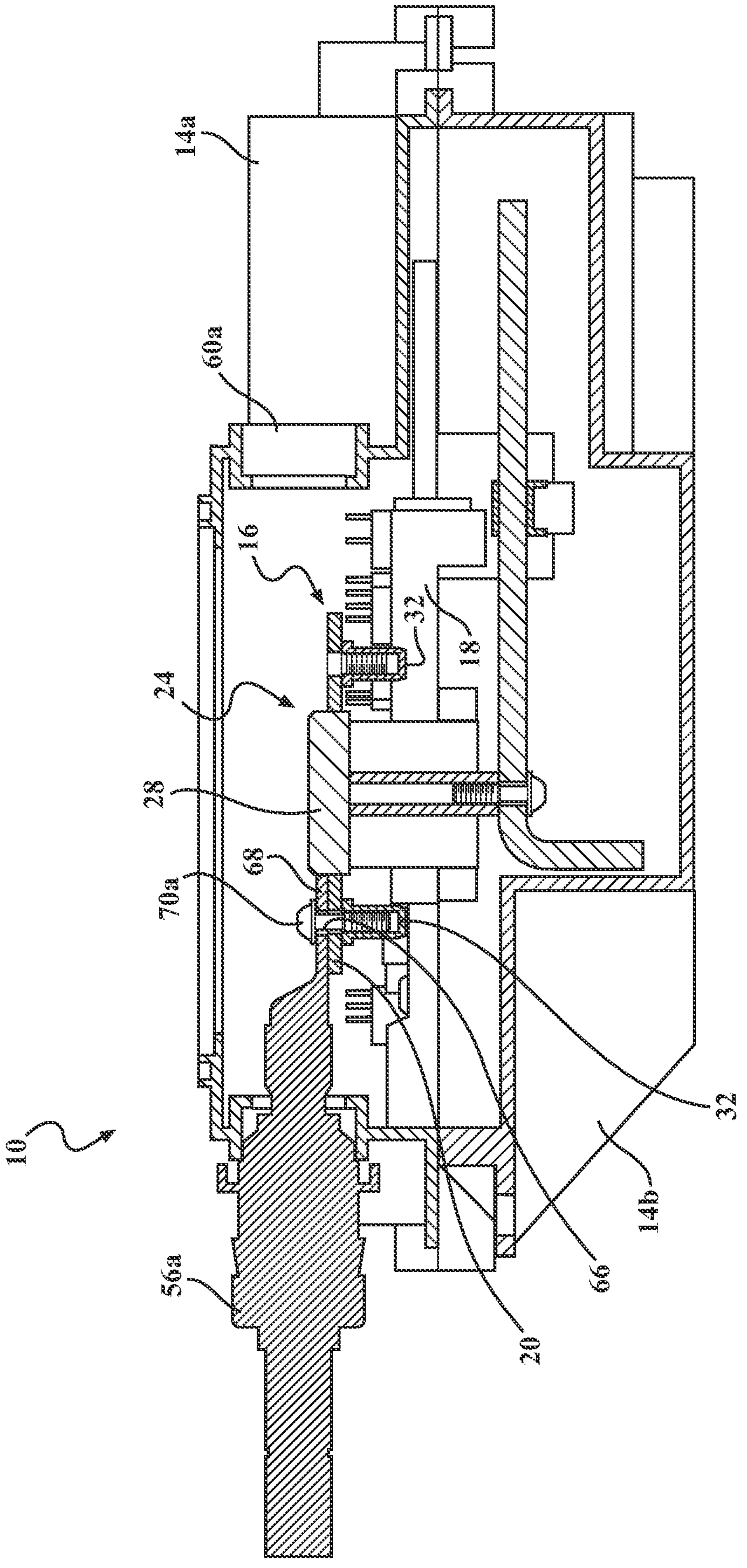
FIG. 4D is a sectional view taken along lines 4D-4D of FIG. 2.
Figure 5A:
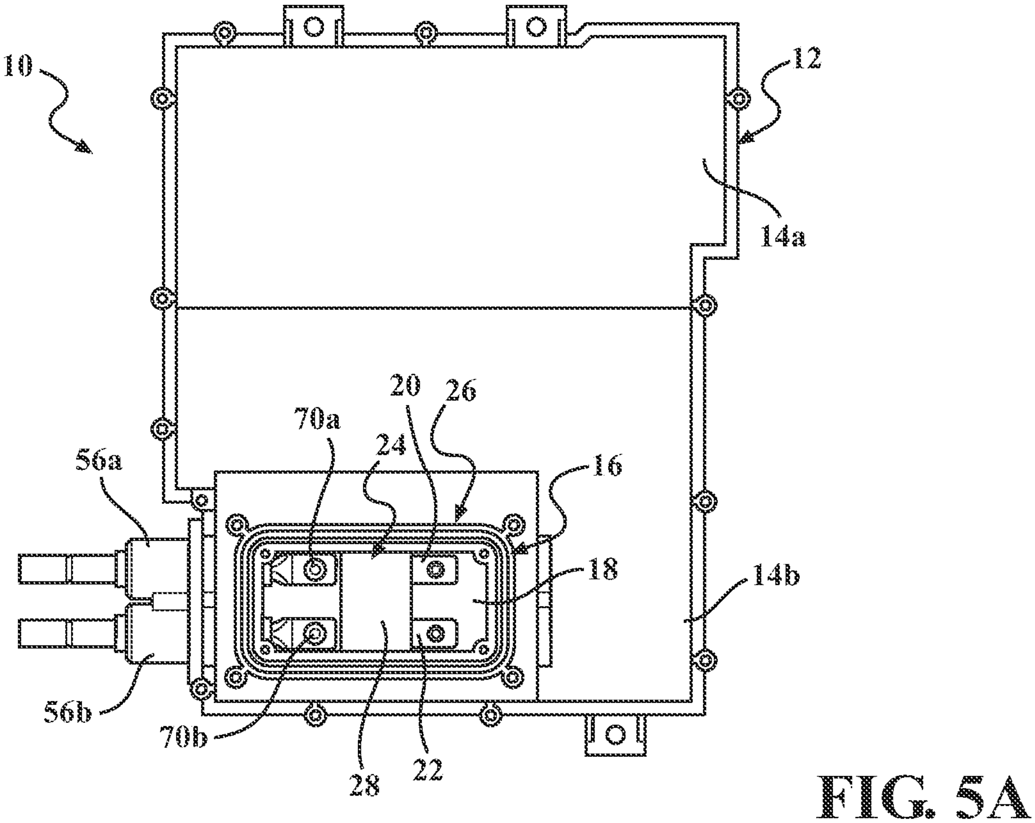
FIG. 5A is a top view of a high voltage inverter having a busbar interconnect system, with the cover of the inverter removed and a pair of DC connectors connected to the interconnect assembly in a first configuration, according to embodiments of the present invention.

Once the first housing portion 14*a* is connected to the second housing portion 14*b*, a pair of DC connectors 56*a*, 56*b* may then be connected to the interconnect assembly 24. Referring to FIGS. 1-2, 4C-4D, and 5A-5B, the first housing portion 14*a* includes a first pair of connector apertures 58*a*,58*b* and a second pair of connector apertures 60*a*,60*b*. In a first configuration, shown in FIG. 2, the first DC connector 56*a* is connected the first housing portion 14*a* such that the first DC connector 56*a* extends through the first connector aperture 58*a* and is connected to a first end 62*a* the first bus bar 20. Also, in the first configuration, the second DC connector 56*b* is connected to the first housing portion 14*a* such that the second DC connector 56*b* extends through the second connector aperture 58*b* and is connected to a first end 64*a* the second bus bar 22. More specifically, each DC connector 56*a*,56*b* includes a corresponding terminal, and an assembly aperture is formed as part of the terminal. In a non-limiting example, a fastener 70*a* is inserted through the assembly aperture 66 of the terminal 68 of the DC connector 56*a*, through the mounting aperture 30, and into the connection feature 32 connected to the first end 62*a* of the busbar 20, as shown in FIGS. 2, 4D and 5A. The terminal of the second DC connector 56*b* is connected to the first end 64*a* of the second busbar 22 in a similar manner.

Figure 5B:
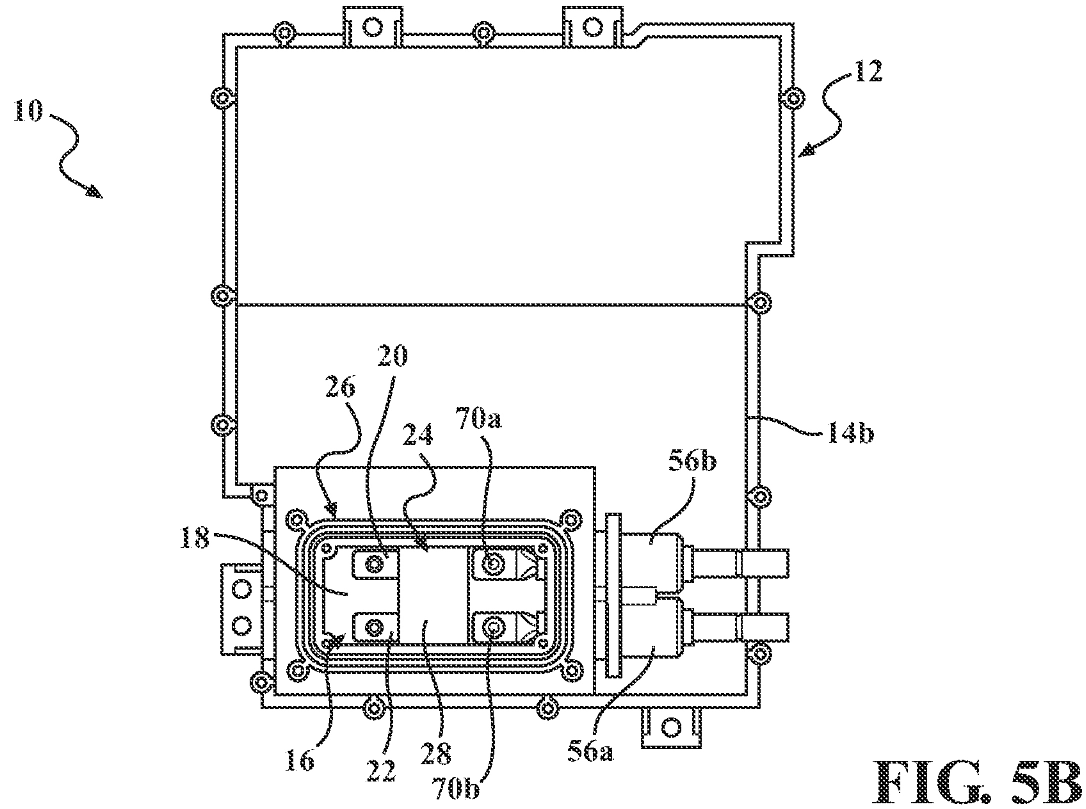
FIG. 5B is a top view of a high voltage inverter having a busbar interconnect system, with the cover of the inverter removed and a pair of DC connectors connected to the interconnect assembly in a second configuration, according to embodiments of the present invention.

In a second configuration, the DC connectors 56*a*,56*b* may be connected to the second ends 62*b*,64*b* of the busbars 20,22, respectively. More specifically, in the second configuration, shown in FIG. 5B, first DC connector 56*a* is connected the first housing portion 14*a* such that the first DC connector 56*a* extends through the first connector aperture 60*a* and is connected to the second end 62*b* the first bus bar 20. Also, in the second configuration, the second DC connector 56*b* is connected to the first housing portion 14*a* such that the second DC connector 56*b* extends through the second connector aperture 60*b* and is connected to a second end 64*b* the second bus bar 22. In a similar manner as described above, the fastener 70*a* is inserted through the assembly aperture 66 of the terminal 68 of the DC connector 56*a*, through the mounting aperture 30, and into the connection feature 32 connected to the second end 62*b* of the busbar 20, as shown in FIG. 5B. The terminal of the second DC connector 56*b* is connected to the second end 64*b* of the second busbar 22 in a similar manner using the fastener 70*b*.

Mounting the DC connectors 56*a*,56*b* in one of the two configurations described above provides a connection between the high-voltage (HV) DC battery the HV inverter 10 in a vehicle. The interconnect assembly 24 is suitable for use with a common HV inverter and vehicles having various powertrain architectures.

The use of the interconnect assembly 24 facilities only necessitating the change of the location of the DC connectors 56*a*,56*b* to accommodate different vehicle applications.

The use of the interconnect assembly 24 also allows for the flexibility of installing the HV DC input into the inverter 10 in multiple locations.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:

a busbar interconnect system, comprising:

a housing of an inverter;

an interconnect assembly mounting in the housing, the interconnect assembly further comprising:

an insulator housing;

a first busbar having a first end and a second end, the first busbar at least partially surrounded by the insulator housing;

a second busbar having a first end and a second end, the second busbar at least partially surrounded by the insulator housing;

a mounting bracket at least partially surrounded by the insulator housing, the mounting bracket mounted to the housing;

wherein, in a first configuration, a first of a plurality of connectors is connected to the first end of the first busbar and a second of the plurality of connectors is connected to the first end of the second busbar, and in a second configuration, the first of the plurality of connectors is connected to the second end of the first busbar and the second of the plurality of connectors is connected to the second end of the second busbar.

2. The apparatus of claim 1, the housing of the inverter further comprising:

a first housing portion;

a second housing portion connected to the first housing portion and forming a cavity, the interconnect assembly disposed in the cavity;

a first mounting boss integrally formed as part of the second housing portion; and a second mounting boss integrally formed as part of the second housing portion;

wherein the mounting bracket is connected to the first mounting boss and the second mounting boss.

3. The apparatus of claim 2, the mounting bracket further comprising:

a first leg, which protrudes from the insulator housing;

a first mounting flange integrally formed with the first leg;

a second leg, which protrudes from the insulator housing;

a second mounting flange integrally formed with the second leg;

wherein the first mounting flange is connected to the first mounting boss, and the second mounting flange is connected to the second mounting boss.

4. The apparatus of claim 2, the first housing portion of the inverter further comprising:

a first pair of apertures integrally formed as part of the first housing portion; and a second pair of apertures integrally formed as part of the first housing portion;

wherein, in the first configuration, the first of the plurality of connectors extends through one of the first pair of apertures when the first of the plurality of connectors is connected to the first end of the first busbar, and the second of the plurality of connectors extends through another of the first pair of apertures when the second of the plurality of connectors is connected to the first end of the second busbar, wherein, in the second configuration, the first of the plurality of connectors extends through one of the second pair of apertures when the first of the plurality of connectors is connected to the second end of the first busbar, and the second of the plurality of connectors extends through another of the second pair of apertures when the second of the plurality of connectors is connected to the second end of the second busbar.

5. The apparatus of claim 1, each of the plurality of connectors further comprising:

a terminal having an assembly aperture;

wherein the terminal is connected to one of the first busbar or the second busbar when the plurality of connectors are in the first configuration or the second configuration.

6. An interconnect assembly for an inverter, comprising:

an insulator housing;

a first busbar having a first end and a second end, the first end of the first busbar protruding out of the opposite side of the insulator housing as the second end of the first busbar;

a second busbar having a first end and a second end, the first end of the second busbar protruding out of the opposite side of the insulator housing as the second end of the second busbar; and a mounting bracket extending through the insulator housing, the mounting bracket connected to a housing of an inverter;

wherein, in a first configuration, a first of a plurality of connectors is connected to the first end of the first busbar and a second of the plurality of connectors is connected to the first end of the second busbar, and in a second configuration, the first of the plurality of connectors is connected to the second end of the first busbar and the second of the plurality of connectors is connected to the second end of the second busbar.

7. The interconnect assembly for an inverter of claim 6, the mounting bracket further comprising:

a first leg;

a first mounting flange integrally formed with the first leg;

a second leg; and a second mounting flange integrally formed with the second leg;

wherein the first leg and the second leg protrude from the insulator housing.

8. The interconnect assembly for an inverter of claim 7, the housing of the inverter further comprising:

a first housing portion;

a second housing portion connected to the first housing portion and forming a cavity, the interconnect assembly disposed in the cavity;

a first mounting boss integrally formed as part of the second housing portion; and a second mounting boss integrally formed as part of the second housing portion;

wherein the first mounting flange is connected to the first mounting boss, and the second mounting flange is connected to the second mounting boss.

9. The interconnect assembly for an inverter of claim 8, the first housing portion of the inverter further comprising:

a first pair of apertures integrally formed as part of the first housing portion; and a second pair of apertures integrally formed as part of the first housing portion;

wherein, in the first configuration, the first of the plurality of connectors extends through one of the first pair of apertures when the first of the plurality of connectors is connected to the first end of the first busbar, and the second of the plurality of connectors extends through another of the first pair of apertures when the second of the plurality of connectors is connected to the first end of the second busbar, wherein, in the second configuration, the first of the plurality of connectors extends through one of the second pair of apertures when the first of the plurality of connectors is connected to the second end of the first busbar, and the second of the plurality of connectors extends through another of the second pair of apertures when the second of the plurality of connectors is connected to the second end of the second busbar.

10. The interconnect assembly for an inverter of claim 6, each of the plurality of connectors further comprising:

a terminal having an assembly aperture;

wherein the terminal is connected to one of the first busbar or the second busbar when the plurality of connectors are in the first configuration or the second configuration.

* * * * *